US010118159B2

United States Patent
Mandan et al.

(10) Patent No.: US 10,118,159 B2
(45) Date of Patent: *Nov. 6, 2018

(54) CATALYST COMPOSITION AND A CATALYTIC PROCESS FOR CONVERSION OF BIOMASS TO CRUDE BIO OIL

(71) Applicant: RELIANCE INDUSTRIES LIMITED, Mumbai, Maharashtra (IN)

(72) Inventors: Chidambaram Mandan, Nadu (IN); Kshudiram Mantri, West Bengal (IN); Supriya Apegaonkar, Maharashtra (IN); Ramesh Bhujade, Maharashtra (IN); Nagesh Sharma, Gujara (IN); Raksh Jasra, Gujara (IN)

(73) Assignee: Reliance Industries Limited, Mumbai (IN)

( * ) Notice: Subject to any disclaimer, the term of this patent is extended or adjusted under 35 U.S.C. 154(b) by 363 days.

This patent is subject to a terminal disclaimer.

(21) Appl. No.: 14/652,283

(22) PCT Filed: May 8, 2014

(86) PCT No.: PCT/IN2014/000313
§ 371 (c)(1),
(2) Date: Jun. 15, 2015

(87) PCT Pub. No.: WO2015/033350
PCT Pub. Date: Mar. 12, 2015

(65) Prior Publication Data
US 2015/0306575 A1    Oct. 29, 2015

(30) Foreign Application Priority Data

Sep. 6, 2013 (IN) .......................... 2899/MUM/2013

(51) Int. Cl.
*B01J 23/883* (2006.01)
*B01J 27/24* (2006.01)
(Continued)

(52) U.S. Cl.
CPC ............. *B01J 23/883* (2013.01); *B01J 21/04* (2013.01); *B01J 21/066* (2013.01); *B01J 23/464* (2013.01);
(Continued)

(58) Field of Classification Search
CPC . B01J 21/04; B01J 21/06; B01J 21/063; B01J 21/08; B01J 21/12; B01J 21/14;
(Continued)

(56) References Cited

U.S. PATENT DOCUMENTS 4,121,996 A * 10/1978 Hilfman ................ B01J 29/20
            208/111.15
2010/0294698 A1 * 11/2010 e Mello ............... C10G 25/003
            208/210
(Continued)

FOREIGN PATENT DOCUMENTS

CA    1 201 080 A1    2/1986
EP    1 880 760 A1    1/2008
(Continued)

OTHER PUBLICATIONS

Rashmi Tiwari et al.; "Hydrotreating and Hydrocracking Catalysts for Processing of Waste Soya-Oil and Refinery-Oil Mixtures" Catalysis Communications vol. 12, Issue 6, Feb. 10, 2011, pp. 559-562 Abstract.

*Primary Examiner* — Jun Li
(74) *Attorney, Agent, or Firm* — Ladas & Parry LLP (57) ABSTRACT

The present disclosure provides a catalyst composition for conversion of biomass to crude bio oil. The composition comprises at least one metal compound, at least one support (Continued)

and at least one stabilizing/solubilizing agent. Also disclosed are processes for the preparation of catalyst composition, and hydrothermal conversion of biomass to crude bio oil.

8 Claims, 5 Drawing Sheets

(51) Int. Cl.
| | | |
|---|---|---|
| *B01J 31/26* | (2006.01) | |
| *B01J 29/85* | (2006.01) | |
| *B01J 23/882* | (2006.01) | |
| *B01J 23/46* | (2006.01) | |
| *B01J 21/04* | (2006.01) | |
| *B01J 21/06* | (2006.01) | |
| *B01J 35/02* | (2006.01) | |
| *B01J 35/08* | (2006.01) | |
| *B01J 35/10* | (2006.01) | |
| *B01J 37/02* | (2006.01) | |
| *B01J 37/08* | (2006.01) | |
| *B01J 37/00* | (2006.01) | |
| *B01J 31/02* | (2006.01) | |
| *B01J 31/38* | (2006.01) | |
| *C10B 57/12* | (2006.01) | |
| *C10G 1/00* | (2006.01) | |
| *C10G 3/00* | (2006.01) | |

(52) U.S. Cl.
CPC .............. *B01J 23/882* (2013.01); *B01J 27/24* (2013.01); *B01J 29/85* (2013.01); *B01J 31/0237* (2013.01); *B01J 31/26* (2013.01); *B01J 31/38* (2013.01); *B01J 35/02* (2013.01); *B01J 35/023* (2013.01); *B01J 35/026* (2013.01); *B01J 35/08* (2013.01); *B01J 35/1014* (2013.01); *B01J 35/1019* (2013.01); *B01J 35/1023* (2013.01); *B01J 37/0009* (2013.01); *B01J 37/0203* (2013.01); *B01J 37/08* (2013.01); *C10B 57/12* (2013.01); *C10G 1/00* (2013.01); *C10G 3/45* (2013.01); *C10G 3/46* (2013.01); *C10G 3/47* (2013.01); *C10G 3/48* (2013.01); *C10G 3/49* (2013.01); *B01J 2231/005* (2013.01); *B01J 2531/005* (2013.01); *B01J 2531/008* (2013.01); *C10G 2300/1003* (2013.01); *C10G 2300/1011* (2013.01); *C10G 2300/1014* (2013.01); *Y02P 30/20* (2015.11)

(58) Field of Classification Search
CPC ........ B01J 21/16; B01J 23/464; B01J 23/882; B01J 23/883; B01J 29/85; B01J 31/0237; B01J 27/24; C10G 3/45; C10G 3/46; C10G 3/47; C10G 3/48; C10G 3/49
See application file for complete search history.

(56) References Cited

U.S. PATENT DOCUMENTS

| | | | |
|---|---|---|---|
| 2011/0118107 A1* | 5/2011 | Garcia-Martinez | ...... B01J 29/04 502/62 |
| 2011/0163009 A1* | 7/2011 | Novak | ................ B01J 23/002 208/210 |
| 2011/0287503 A1 | 11/2011 | Lupton et al. | |
| 2012/0018352 A1* | 1/2012 | Seki | ........................ B01J 21/12 208/265 |
| 2012/0055077 A1 | 3/2012 | Savage et al. | |
| 2012/0077667 A1* | 3/2012 | Liu | ..................... H01M 4/8605 502/101 |
| 2012/0083643 A1* | 4/2012 | Rashidi | ................... B01J 21/04 585/855 |
| 2012/0094879 A1 | 4/2012 | Roberts | |
| 2014/0356756 A1* | 12/2014 | Himeno | ............ H01M 8/04089 429/480 |

FOREIGN PATENT DOCUMENTS

| | | | | |
|---|---|---|---|---|
| EP | 2 586 527 A1 | | 5/2013 | |
| WO | WO2011036862 | * | 3/2011 | .............. B01J 23/85 |
| WO | WO 2011/069510 | | 6/2011 | |

\* cited by examiner

CATALYST COMPOSITION AND A CATALYTIC PROCESS FOR CONVERSION OF BIOMASS TO CRUDE BIO OIL

RELATED APPLICATION INFORMATION

This application is a 371 of International Application PCT/IN2014/000313 filed 08 May 2014, which claims priority from India Application No.:2899/MUM/2013 filed 06Sep. 2013, the content of which is incorporated herein by reference.

FIELD OF THE DISCLOSURE

The present disclosure relates to a catalyst composition for conversion of biomass to crude bio oil. The present disclosure also relates to a process for conversion of biomass to crude bio oil in the presence of a catalyst.

BACKGROUND

Definitions:

Biomass:
The term biomass in the context of the present disclosure means material such as organic waste, urban refuse, wood, agricultural crops or wastes, municipal wastes and the like, which can be used as a source of fuel or energy.

Crude Bio Oil:
The term crude bio oil in the context of the present disclosure means an oil or biofuel derived from biomass and which can be used as an alternative to petroleum fuel.

Biomass, a renewable energy source, can either be used directly via combustion to produce heat, or indirectly after converting it to various forms of biofuels. Biofuels are derived from biomass and are intended to provide an alternative to petroleum fuels. Conversion of biomass to biofuel can be achieved by different methods which are broadly classified into thermal, chemical and biochemical methods.

Fossil fuels such as petroleum, natural gas and coal are typically formed through the processes of thermochemical conversion (TCC) from biomass buried beneath the ground. TCC is a chemical reforming process of biomass in a heated and usually pressurized, oxygen deprived enclosure, where long—chain organic compounds break into short—chain hydrocarbons such as syngas or oil. TCC is a broad term that includes gasification, including the Fisher-Tropsch process, direct liquefaction, hydrothermal liquefaction and pyrolysis. Pyrolysis is a heating process of dried biomass to directly produce syngas and/or oil. Both gasification and pyrolysis require dried biomass as feedstock and the processes occur in an environment higher than 600° C.

Hydrothermal liquefaction is a process for converting high-moisture waste biomass into energy dense "crude bio oil" that can be used for direct combustion or refined for transportation grade fuels.

HTL, also called hydrous pyrolysis, is a process for the reduction of complex organic materials such as bio-waste or biomass into crude oil and other chemicals.

In hydrothermal liquefaction (HTL) technique, which involves the application of heat and pressure on the biomass medium, lipids and other organic components can be converted while the biomass is in a wet condition. During HTL, high moisture biomass is subjected to elevated temperature (250-400° C.) and pressure (up to 225 bars) in order to break down and reform the chemical building blocks into crude bio oil. HTL of biomass gives only crude bio oils that need to be further treated/refined to get finished crude oil products. The hydrothermal process breaks down bio macromolecules from the wet biomass and promotes heteroatom removal.

Some of the representative patent documents which disclose conversion of biomass into crude bio oil are discussed herein below.

CA1201080 mentions a process for directly converting biomass into hydrocarbons in one step which consists of liquefying and deoxygenating solid particles of biomass dispersed in water in the presence of a catalyst system comprising a crystalline aluminosilicate zeolite containing finely divided and dispersed metal particles at conditions sufficient to obtain hydrocarbons.

U.S. Pat No. 20110287503 suggests a method for producing hydrocarbon oils from algal biomass. The algal biomass is hydrogenolysed under reaction conditions sufficient to produce partially deoxygenated lipid-based oil. The algal biomass is hydrogenolysed by liquefying the algal biomass in the presence of a hydrogenolytic catalyst in a hydrogen atmosphere at an elevated temperature and pressure to produce an organic phase containing the partially deoxygenated lipid-based oil, an aqueous phase, and a solid phase. The aqueous and solid phases are removed from the partially deoxygenated lipid-based oil. The partially deoxygenated lipid-based oil is then substantially deoxygenated using a hydroprocessing catalyst to produce the hydrocarbon oil. The yield of oil as per the process disclosed in US20110287503 is approximately 40%.

U.S. Pat No. 20120094879 suggests the processing of biomass based feeds under hydrothermal treatment conditions to produce a hydrocarbon liquid product and a solid portion. The hydrothermal treatment can be performed in the presence of heterogeneous catalyst particles that can optionally include a catalyst metal or metal salt. The presence of the heterogeneous catalyst can modify the nature of the hydrocarbon products produced from the hydrothermal treatment. The yield of the oil as per the process disclosed in US20120094879 is approximately 43%.

U.S. Pat. No. 20120055077 suggests a method of producing an upgraded bio-oil from a wet biomass which involves heating the wet biomass at a first temperature (200 to 400° C.) and a first pressure (0.1 to 25 MPa) for a time period ranging from 10 to 200 minutes to form a crude bio-oil and heating the crude bio-oil and water at a second temperature and a second pressure for a time period of at least 30 minutes to form the upgraded bio-oil, wherein the second temperature is greater than the first temperature and is at least 300° C.

As per the procedure suggested in U.S. Pat No. 20120055077, the biomass is subjected to heat twice i.e. heating at a first temperature and at a first pressure followed by heating at a second temperature and at a second pressure. The first heating is below supercritical condition, whereas the second heating is above supercritical condition.

The suggested processes are associated with certain drawbacks such as low yielding and are non-energy efficient because they require multiple heating of the biomass.

Accordingly, there is a need for an energy efficient, time saving and high yielding process for hydrothermal conversion of biomass to crude bio oil which is capable of regeneration of a catalyst and employs the re-generated catalyst efficiently.

Objects

Some of the objects of the present disclosure, which at least one embodiment herein satisfies, are as follows:

It is an object of the present disclosure to provide a catalyst composition for conversion of biomass to crude bio oil.

It is another object of the present disclosure to provide a re-generable and re-cyclable catalyst composition for conversion of biomass to crude bio oil.

It is still another object of the present disclosure to provide a re-usable catalyst composition exhibiting catalytic performance similar to a fresh catalyst composition when used for conversion of biomass to crude bio oil.

It is still another object of the present disclosure to provide a simple, energy efficient and economic process for the preparation of a catalyst composition suitable for conversion of biomass to crude bio oil.

It is yet another object of the present disclosure to provide a process for conversion of biomass to crude bio oil in the presence of a catalyst composition.

It is still another object of the present disclosure to provide a simple, energy efficient, time saving and high yielding process for conversion of biomass to crude bio oil in the presence of a catalyst composition.

It is yet another object of the present disclosure to provide a process which is capable of producing crude bio oil compatible with crude used in the refinery process.

It is a further object of the present disclosure to provide a process which is capable of producing crude bio oil containing high carbon content.

Other objects and advantages of the present disclosure will be more apparent from the following description which is not intended to limit the scope of the present disclosure.

SUMMARY

In accordance with one aspect of the present disclosure there is provided a catalyst composition for conversion of biomass to crude bio oil; said composition comprising:
  i. at least one metal in an amount of 0.1 to 15 wt. %, wherein the metal is selected from the group consisting of group Ib, group IIb metals, group IVb metals, group Vb metals, group VIb metals, group VIIb metals, group VIII metals and noble metals;
  ii. at least one support in an amount of 30 to 96 wt %; and
  iii. at least one solubilizing agent in an amount of 4 to 50 wt. %, said solubilizing agent selected from the group consisting of ammonia solution, piperidine, pyrrolidine, morpholine, piperazine hydrate, 2-methylcyclohexyl amine, cyclohexylamine and hexamethyleneimine.

The support can be selected from the group consisting of alumina, silica, zirconia, alumina-silica, zeolite and molecular sieves.

The support can comprise a) 30 to 100 wt % at least one carrier selected from the group consisting of alumina, silica, zirconia, alumina-silica, zeolite and molecular sieves; b) 0.001 to 70 wt % of at least one binder selected from the group consisting of aluminophosphate, psuedoboehmite, alumina oxide, silica and ludox silica solution.

The support can also comprise a) 30 to 100 wt % at least one carrier selected from the group consisting of nano-structured aluminum oxide, nano-structured silicon oxide, nano-structured zirconium oxide, nano-structured cerium oxide, nano-structured titanium oxide, nano-structured tantalum oxide; b) 0.001 to 70 wt % of at least one binder selected from the group consisting of aluminophosphate, psuedoboehmite, alumina oxide, silica and ludox silica solution.

Alternatively, the support can comprise a) 30 to 100 wt % at least one carrier selected from the group consisting of mesoporous alumino silicate, mesoporous silicalite, mesoporous molecular sieves; b) 0.001 to 70 wt % of at least one binder selected from the group consisting of aluminophosphate, psuedoboehmite, alumina oxide, silica and ludox silica solution.

The support can be in the form of extrudates, spheres, pellets and powder.

The extrudates can have a length ranging from 4 to 6 mm, a diameter ranging from 1 to 2 mm and a surface area ranging from 25 to 1000 $m^2/gm$; and the spheres and pellets have a diameter of ranging from 3 to 10 mm.

The metal can be selected from the group consisting of nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru) and rhodium (Rh).

In one embodiment the catalyst composition of the present disclosure can be characterized by:
  i. total acid strength ranging from 0.05 to 3.5 mmole/gm of ammonia; and
  ii. pore width ranging from 1 to 20 nm.

In accordance with another aspect of the present disclosure there is provided a process for the preparation of a catalyst composition having at least one metal in an amount of 0.1 to 15 wt. %; at least one support in an amount of 30 to 96 wt %; and at least one solubilizing agent in an amount of 4 to 50 wt. %, said process comprising the following steps:
  a. obtaining at least one support;
  b. preparing at least one dispersion containing at least one metal or metal compound, said metal compound comprises a metal selected from the group consisting of group Ib metals, group IIb metals, group IVb metals, group Vb metals, group VIb metals, group VIIb metals, group VIII metals and noble metals;
  c. adding at least one solubilizing agent to one or more of said at least one dispersion/s;
  d. obtaining a mixture of said at least one dispersion, wherein the one or more of said at least one dispersion/s comprises said at least one solubilizing agent;
  e. impregnating said mixture in said support to obtain a metal impregnated support; and
  f. drying the metal impregnated support followed by calcining and reducing to obtain the catalyst composition.

The process of the present disclosure can comprise a step of mixing at least two dispersions containing at least one metal or metal compound before the addition of at least one solubilizing agent.

The dispersion/s can be prepared by mixing at least one metal or metal compound, at least one solubilizing agent selected from the group consisting of piperidine, pyrrolidine, morpholine, piperazine hydrate, 2-methylcyclohexyl amine, cyclohexylamine and hexamethyleneimine, and at least one solvent selected from the group consisting of polar solvents and non-polar solvents.

In one embodiment the step of obtaining a support includes the steps of mixing at least one carrier; at least one binder selected from the group consisting of aluminophosphate, psuedoboehmite, silica, alumina oxide, and ludox silica solution; at least one agent selected from the group consisting of peptizing agent, pH adjusting agent and template directing agent; and optionally, at least one liquid medium; in any order to obtain a dough, obtaining extrudates from said dough, drying said extrudates and calcining said dried extrudates, wherein, the peptizing agent is at least one selected from the group consisting of phosphoric acid and acetic acid;

the pH adjusting agent is at least one compound selected from the group consisting of nitric acid, ammonium hydroxide and trimethylammonium hydroxide;

the template directing agent is at least one selected compound selected from the group consisting of pluronic 123 and cetyltrimethylammonium bromide; and the liquid medium is at least one selected from the group consisting of water and ethyl alcohol.

In accordance with yet another aspect of the present disclosure there is provided a process for conversion of biomass to crude bio oil; said process comprising the following steps:

b. preparing and/or collecting a biomass slurry; wherein the concentration of the biomass in the slurry ranges from 5 to 35 wt %;

c. preparing a catalyst composition by a process of the present disclosure;

d. adding said catalyst composition in an amount ranging from 1 to 20 wt. % with respect, to the biomass to said slurry to obtain a mixture; and e. heating the mixture at a temperature ranging from 200 to 350° C. and at a pressure ranging from 70 to 250 bars for a time period ranging from 10 to 180 minutes to obtain the crude bio oil and a residue containing catalyst.

The method step of heating can be carried out in the presence of at least one hydrogen source.

The biomass can be selected from the group consisting of organic waste, agricultural residues, urban refuse, land- and water-based plant material and microorganism.

The biomass can be at least one algae selected from the group of divisions consisting of Rhodophyta, Chlorophyta, Phaeophyta, Chrsophyta, Cryptophyta, Dinophyta, Tribophyta, Glaucophyta, Charophyta, Ochrophyta, Protista and Blue green algae (cyanobacteria) and specifically can be *Spirulina, Nannochloropsis, Chlorella, Euglena, Microcystis, Dictyosphaerium Anabaena, Nodularia, Oscillatoria, Spirogyra, hydrodictyon, Chara, Nitella, Oedognium* and *Phormidium*.

DETAILED DESCRIPTION

Figure 1:
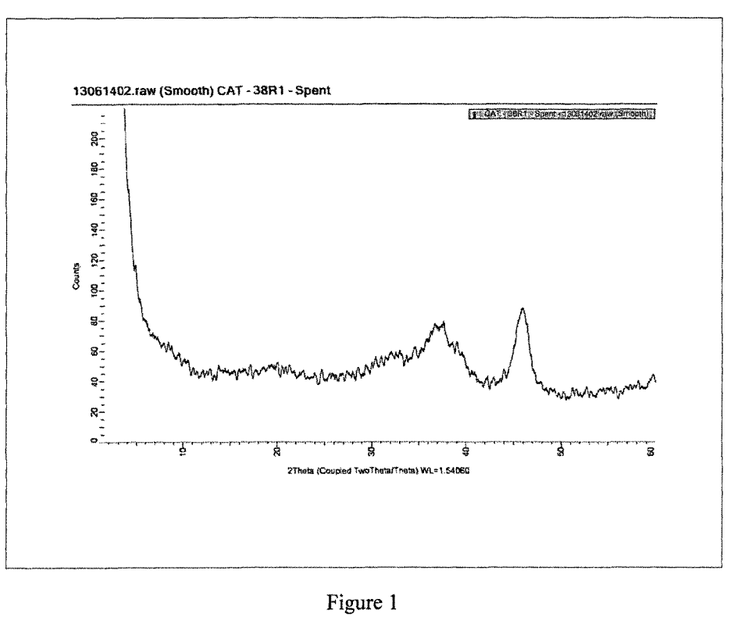
FIG. 1 illustrates XRD of CoMo/Al2O3 catalyst.
Figure 2:
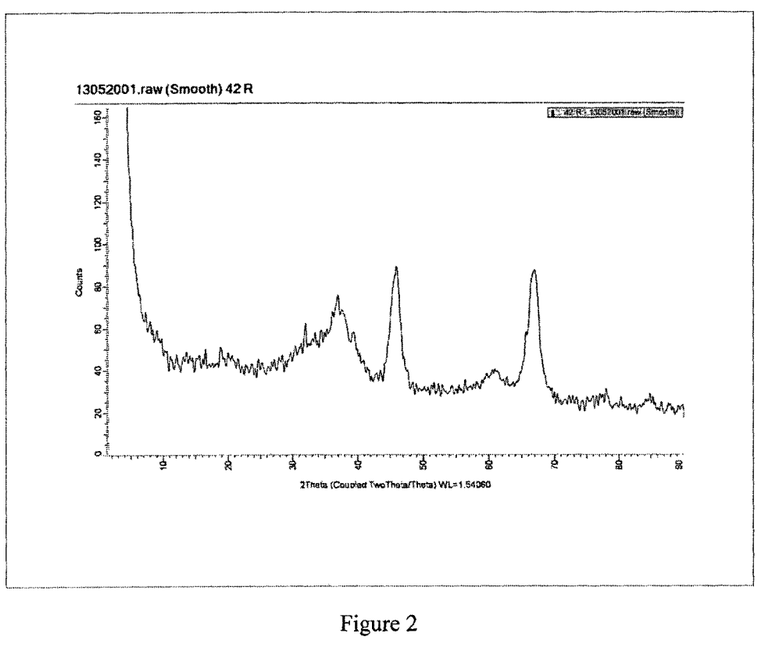
FIG. 2 illustrates XRD of NiMo/Al2O3 catalyst.
Figure 3:
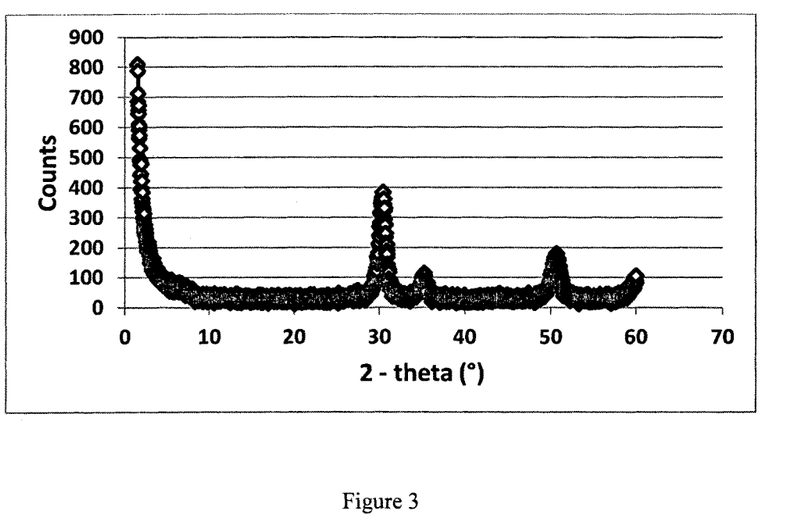
FIG. 3 illustrates XRD of CoMo/ZrO2 catalyst.
Figure 4:
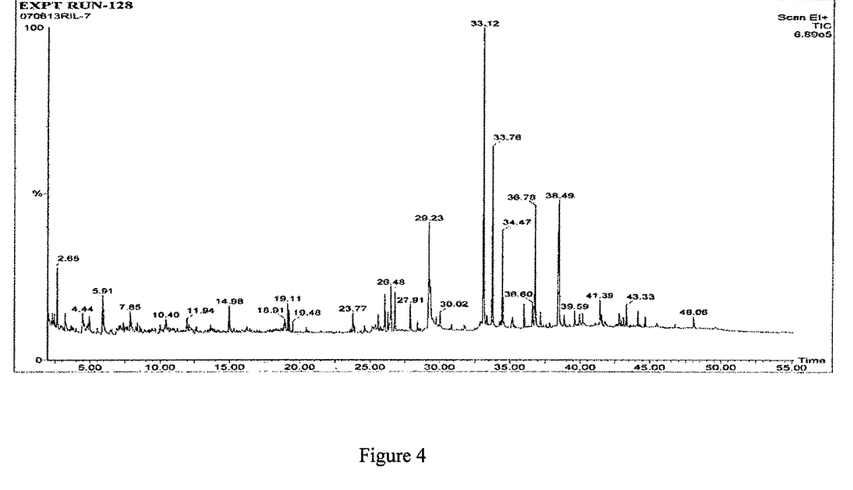
FIG. 4 illustrates GCMS chromatogram of crude bio oil.
Figure 5:
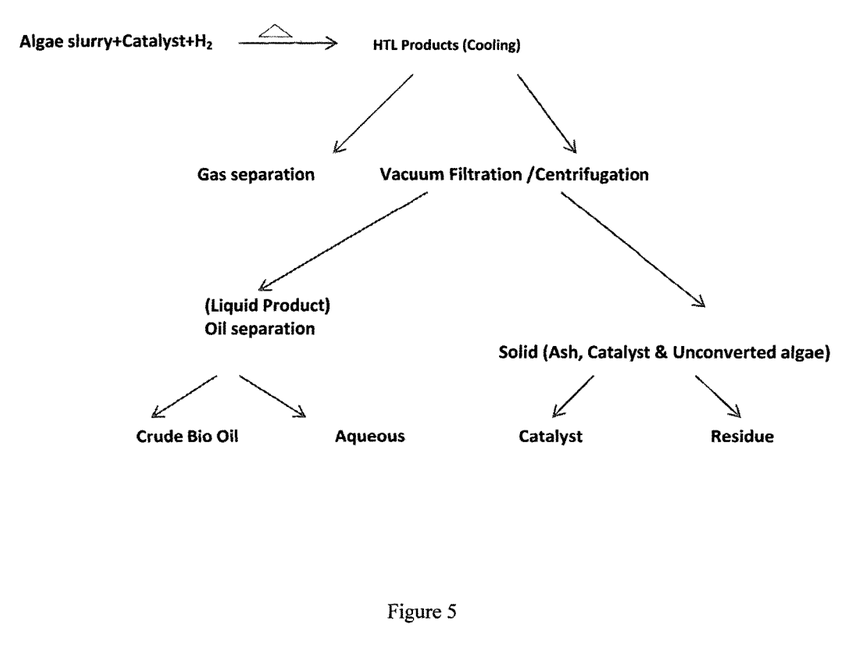
FIG. 5 illustrates a process for the preparation of crude bio oil.

Considering the drawbacks associated with known hydrothermal liquefaction methods for the conversion of biomass to crude bio oil, such as time consumption, energy consumption and low yield, the inventors of the present disclosure focused on improving the hydrothermal liquefaction method. The inventors of the present disclosure found that the hydrothermal conversion of biomass such as algae can be efficiently carried out in the presence of a catalyst composition. It is further found that a specific catalyst composition plays a crucial role in producing quality crude bio oil. It is particularly found that the use of a strong base such as piperidine, pyrrolidine, morpholine, piperazine hydrate, 2-methylcyclohexyl amine, cyclohexylamine and hexamethyleneimine in the synthesis of the catalyst composition provides solubilizing effect on the metal salts and results in metal complex formation resulting in enhanced metal impregnation in support. This in turn helps in stabilization of the catalyst composition on supports such as a metal oxide support. The inventors surprisingly found that this catalyst system efficiently performs the catalytic reaction and produces crude bio oil from biomass.

Accordingly, the present disclosure provides a catalyst composition for conversion of biomass to crude bio oil. The composition mainly contains at least one metal in an amount of 0.1 to 15 wt. %, at least one support in an amount of 30 to 96 wt %, and at least one solubilizing agent in an amount of 4 to 50 wt. %.

The support present in the catalyst composition is selected from the group consisting of alumina, silica, zirconia, alumina-silica, zeolite and molecular sieves.

The support present in the catalyst composition in one embodiment comprises a) 30 to 100 wt % at least one carrier selected from the group consisting of alumina, silica, zirconia, alumina-silica, zeolite and molecular sieves; b) 0.001 to 70 wt % of at least one binder.

The support present in the catalyst composition in another embodiment comprise a) 30 to 100 wt % at least one carrier selected from the group consisting of nano-structured aluminum oxide, nano-structured silicon oxide, nano-structured zirconium oxide, nano-structured cerium oxide, nano-structured titanium oxide, nano-structured tantalum oxide; b) 0.001 to 70 wt % of at least one binder.

The support present in the catalyst composition in yet another embodiment comprise a) 30 to 100 wt % at least one carrier selected from the group consisting of mesoporous alumino silicate, mesoporous silicalite, mesoporous molecular sieves; b) 0.001 to 70 wt % of at least one binder.

Examples of binder useful for the purpose of the present invention include aluminum oxide, aluminophosphate, psuedoboehmite, silica and ludox silica solution.

It is to be noted here that though the support is prepared using peptizing agent is used, during the preparation of the support, the peptizing agent does not remain in the support due to calcination. Therefore, the peptizing agent is also absent in the catalyst composition.

In an exemplary embodiment, the support used in the catalyst composition of the present disclosure is in the form of extrudates, spheres, or pellets. The length of the extrudate ranges from 4 to 6 mm, diameter of the extrudate ranges from 1 to 2 mm and surface area ranges from 25 to 1000 $m^2/gm$. The diameter of sphere and pellets ranges from 3 to 10 mm, respectively.

The metal in the catalyst composition includes but is not limited to group Ib metals, group IIb metals, group IVb metals, group Vb metals, group VIb metals, group VIIb metals, group VIII metals and noble metals. Particularly, the metal is selected from the group consisting nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru) and rhodium (Rh).

The metal compound useful to introduce the metal contains a cation which includes but is not limited to nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru) and rhodium (Rh); and an anion which includes but is not limited to chlorides, bromides, fluorides, iodides, sulfates, phosphates, phosphonates, nitrates, nitrites, carbonates, acetates, acetylacetate, acetylacetonate, bicarbonates, hydroxides and oxides.

The solubilizing agent employed in the catalyst composition of the present disclosure is selected from the group consisting of piperidine, pyrrolidine, morpholine, piperazine hydrate, 2-methylcyclohexyl amine, cyclohexylamine and hexamethyleneimine. Preferably, the solubilizing agent is hexamethyleneimine.

The catalyst composition of the present disclosure is mainly characterized by the following:
- total acid strength ranging from 0.05 to 3.5 mmole/gm of ammonia; and
- pore width ranging from 1 to 20 nm.

Further, the support used in the catalyst composition has a surface area ranging from 25 to 1000 $m^2$/gm.

The present disclosure also provides a simple process for preparing the catalyst composition which can be carried out at room temperature.

The process involves the following steps:

In the first step, a support is obtained.

Separately, at least one dispersion containing at least one metal or metal compound and at least one solvent is prepared.

In the next step, at least one solubilizing agent is added to one or more of the at least one dispersion/s. Then a mixture of the at least one dispersion, wherein the one or more of the at least one dispersion/s comprises said at least one solubilizing agent is prepared.

In another embodiment, a step of mixing at least two dispersions containing at least one metal or metal compound before the addition of at least one solubilizing agent is carried out, i.e. at least two dispersions each containing at least one metal or metal compound are mixed to obtain a mass/complex and to this mass at least one solubilizing agent is added to obtain a mixture.

In another exemplary embodiment, molybdenum dispersion in water is prepared by adding ammonium molybdate in water. Due to its properties molybdenum remains un-dissolved in water. To dissolve molybdenum, hexamethyleneimine (HMI) is added to the dispersion to obtain a dispersion in which molybdenum is dissolved in water. Separately, a dispersion in which nickel is dissolved in water is prepared and mixed with the dispersion in which molybdenum is dissolved in water. HMI present in the molybdenum dispersion also stabilizes the complex of molybdenum and cobalt.

In the next step, the obtained mixture is impregnated in the support to obtain a metal impregnated support which is then dried, calcined and reduced to obtain the catalyst composition.

In the context of the present disclosure the term "dispersion" means a metal or metal compound either dissolved or undissolved in a solvent. Not all metal compounds are soluble in a solvent but they can be solubilized by adding a solubilizing agent. Therefore, in case of metal compounds insoluble in the solvent, a suspension containing the metal compound and the solvent is obtained before the addition of the solubilizing agent. After the addition of the solubilizing agent the suspension is converted into dispersion where the metal compound is dispersed in the solvent.

In accordance with the present disclosure the solvent for preparing the at least one dispersion is selected from the group consisting of polar solvents and non-polar solvents.

In one exemplary embodiment, at least one dispersion is prepared by mixing at least one metal or metal compound, at least one solubilizing agent selected from the group consisting of piperidine, pyrrolidine, morpholine, piperazine hydrate, 2-methylcyclohexyl amine, cyclohexylamine and hexamethyleneimine, and at least one solvent selected from the group consisting of polar solvents and non-polar solvents.

In another exemplary embodiment, a first metal dispersion (e.g., of Co) and a second metal dispersion (e.g., of Ni) are prepared separately and mixed together to obtain a mixture. To this mixture a solubilizing agent is added. The solubilizing agent (HMI) also acts as a stabilizing agent for stabilizing the complex of cobalt and nickel.

In one embodiment of the present disclosure, the metal or metal compounds in dispersions are different.

In accordance with the present disclosure the step of preparing a metal dispersion is carried out at a temperature of 20 to 80° C. for a time period of about 5 to 60 minutes.

Further, the drying of metal impregnated carrier is carried out at a temperature of 80 to 150° C., whereas the calcining is carried out at a temperature of 500 to 700° C. in the presence of air and reduction is carried out at a temperature of 400 to 600° C. for a time period of about 1 to 6 hours in the presence of hydrogen.

In accordance with one embodiment the catalyst composition of the present disclosure is a bi-metallic catalyst composition.

The solubilizing agent is used for solubilizing at least one metal compound and for further stabilizing a metallic complex (e.g., a bi-metallic complex).

The metal useful for the purpose of the present disclosure is selected from the group consisting of nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru), rhodium (Rh) and combinations thereof.

Alternately, the metal compound used in the preparation of the catalyst composition. The metal compound that provides said metal contains a cation selected from the group consisting of nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru) and rhodium (Rh); and an anion selected from the group consisting of chlorides, bromides, fluorides, iodides, sulfates, phosphates, phosphonates, nitrates, nitrites, carbonates, acetates, acetylacetates, acetylacetonates, bicarbonates, hydroxides and oxides.

The solubilizing agent used in the preparation of catalyst composition is selected from the group consisting of piperidine, pyrrolidine, morpholine, piperazine hydrate, 2-methylcyclohexyl amine, cyclohexylamine and hexamethyleneimine, preferably, hexamethyleneimine.

In accordance with the present disclosure the step of preparing a support includes steps of mixing at least one carrier, at least one binder, at least one agent and optionally, at least one liquid medium to obtain dough. The dough is extruded to obtain extrudates which are then dried and calcined. In one embodiment, the drying of extrudate is carried out at room temperature for a time period of 10 to 180 minutes followed by at 80 to 130° C. for a time period of 2 to 8 hours. Typically, the calcining of extrudates is carried out at a temperature of 500 to 700° C. in the presence of air.

The agents useful for the preparation of the support include but are not limited to peptizing agent such as phosphoric acid and acetic acid, pH adjusting agent such as nitric acid, ammonium hydroxide and trimethylammonium hydroxide, and template directing agent such as pluronic 123 and cetyltrimethylammonium bromide.

The liquid medium useful in the preparation of the support includes but is not limited to water and ethyl alcohol.

The support used in the preparation of the catalyst composition is selected from the group consisting of alumina, silica, zirconia, alumina-silica, zeolite and molecular sieves.

Alternatively, the support used in the preparation of the catalyst composition comprises a) 30 to 100 wt % at least one carrier selected from the group consisting of alumina, silica, zirconia, alumina-silica, zeolite and molecular sieves; and b) 0.001 to 70 wt % of at least one binder.

In another embodiment the support used for the preparation of the catalyst composition comprises a) 30 to 100 wt % at least one carrier selected from the group consisting of nano-structured aluminum oxide, nano-structured silicon oxide, nano-structured zirconium oxide, nano-structured cerium oxide, nano-structured titanium oxide, nano-structured tantalum oxide; and b) 0.001 to 70 wt % of at least one binder.

In still another embodiment the support used for the preparation of the catalyst composition comprises a) 30 to 100 wt % at least one carrier selected from the group consisting of mesoporous alumino silicate, mesoporous silicalite, mesoporous molecular sieves; and b) 0.001 to 70 wt % of at least one binder.

The binder employed in the preparation of the catalyst composition is at least one selected from the group consisting of aluminophosphate, psuedoboehmite, alumina oxide, silica and ludox silica solution.

The present disclosure further provides a process for conversion of biomass to crude bio oil using the catalyst composition of the present disclosure. The process involves the following steps:

In the first step, biomass slurry is prepared using processes known in the art. The concentration of the biomass in the slurry ranges from 5 to 35 wt. %. The biomass utilized includes but is not limited to organic waste, agricultural residues, urban refuse, land- and water-based plant material and microorganism. The biomass that can be used is at least one of high and low lipid containing species. Specifically, the biomass can be algae selected from the group of divisions consisting of Rhodophyta, Chlorophyta such as *Chlorella, Dictyosphaerium, Spirogyra, hydrodictyon* and *Oedognium*, Phaeophyta, Chrsophyta, Cryptophyta, Dinophyta, Tribophyta, Glaucophyta, Charophyta such as *Chara* and *Nitella*, Ochrophyta such as *Nannochloropsis*, Protista such as euglena and Blue green algae such as *Spirulina, Microcystis, Anabaena, Nodularia, Oscillatoria, Phormidium* and the like.

In the next step, the catalyst composition of the present disclosure is added to the slurry to obtain a mixture. The amount of catalyst composition utilized ranges from 1 to 20 wt. % with respect to the biomass. The resulting mixture is then heated at a temperature ranging from 200 to 400° C. and at a pressure ranging from 70 to 250 bars for a time period ranging from 10 to 180 minutes to obtain the crude bio oil and a residue containing catalyst composition. Alternatively, the resulting mixture is heated in the presence of a hydrogen source such as hydrogen and/or methane.

The process of the present disclosure further involves the steps which include but are not limited to stirring, cooling, washing, separating and concentrating.

The yield of the crude bio oil according to the process of the present disclosure is found to be in the range of 45% to 80%. Further, the carbon content of the crude bio oil, obtained by the process of the present disclosure, is found to be in the range of 74 to 80%. It is also found after analysis that the crude bio oil contains free fatty acids, nitrogen containing heterocyclic compounds, monocyclic aromatic compounds, dicyclic aromatic compounds, polycyclic aromatic compounds, unsaturated aliphatic compounds, saturated aliphatic compounds, aliphatic and aromatic amino compounds, aliphatic and aromatic amide compounds.

The present disclosure is further described in light of the following examples which are set forth for illustration purpose only and not to be construed for limiting the scope of the disclosure.

EXAMPLE 1

Preparation of a Catalyst Composition

Solution A was prepared by dissolving cobalt acetate (0.863 gm) in water (10 ml) at 30° C. for 10 minutes. Separately, solution B was prepared by dissolving ammonium molybdate (10.41 gm) and hexamethyleneimine (7 gm) in water (70 ml) at 60° C. for 30 minutes at 300 rpm. Solution A and B were then mixed together at 30° C. To this alumina powder (10 gm) was added and mixed for 2 hours to obtain a mixture. The liquid from the mixture was discarded and the remaining mass was dried at room temperature for 2 hours. This mass was further dried at 120° C. for 10 hours and calcined at 600° C. for 6 hours. The resulting calcined mass was subjected to reduction in the presence of hydrogen at 500° C. for 4 hours to obtain the catalyst ($CoMo/Al_2O_3$).

EXAMPLE 1A (COMPARATIVE EXAMPLE)

The process of example 1 was repeated except that 8 gm of ammonia solution (25%) was used instead of hexamethyleneimine (7 gm).

EXAMPLE 1B

The process of example 1 was repeated except that 8 gm of cyclohexylamine was used instead of hexamethyleneimine (7 gm).

EXAMPLE 1C (COMPARATIVE EXAMPLE)

The process of example 1 was repeated except that 8 gm of ammonia solution (25%) was used instead of hexamethyleneimine (7 gm) and zirconia powder was used instead of alumina extrudate.

EXAMPLE 1D

The process of example 1 was repeated except that 8 gm of cyclohexylamine was used instead of hexamethyleneimine (7 gm) and zirconia powder was used instead of alumina extrudate.

EXAMPLE 1E

The process of example 1 was repeated except that zirconia powder was used instead of alumina extrudate.

EXAMPLE 2

Preparation of a Catalyst Composition

Solution A was prepared by dissolving nickel nitrate (1.011 gm) in water (10 ml) at 30° C. for 10 minutes.

Separately, solution B was prepared by dissolving ammonium molybdate (10.41 gm) and hexamethyleneimine (7 gm) in water (70 ml) at 60° C. for 30 minutes at 300 rpm. Solution A and B were then mixed together at 30° C. To this alumina powder (10 gm) was added and mixed for 2 hours to obtain a mixture. The liquid from the mixture was discarded and the remaining mass was dried at room temperature for 2 hours. This mass was further dried at 120° C. for 10 hours and calcined at 600° C. for 6 hours. The resulting calcined mass was subjected to reduction in the presence of hydrogen at 500° C. for 4 hours to obtain the catalyst (NiMo/$Al_2O_3$).

EXAMPLE 2A (COMPARATIVE EXAMPLE)

The process of example 2 was repeated except that 7 gm of ammonia solution (25%) was used instead of hexamethyleneimine (7 gm).

EXAMPLE 2B

The process of example 2 was repeated except that 7 gm of cyclohexylamine was used instead of hexamethyleneimine (7 gm).

EXAMPLE 3

Preparation of Catalyst Composition

Solution A was prepared by dissolving rhodium chloride (0.381 gm) and hexamethyleneimine (7 gm) in water (100 ml) at 30° C. for 30 minutes at 300 rpm. To this zirconia powder (10 gm) was added and mixed for 2 hours at 30° C. to obtain a mixture. The liquid from the mixture was discarded and the remaining mass was dried at room temperature for 2 hours. This mass was further dried at 120° C. for 10 hours and calcined at 600° C. for 6 hours. The resulting calcined mass was subjected to reduction in the presence of hydrogen at 500° C. for 4 hours to obtain the catalyst (Rh/zirconia).

EXAMPLE 4A

Catalytic Hydrothermal Liquefaction using Marine Microalgae, *Nannochloropsis*

21 g *Nannochloropsis* as 20% slurry in water was loaded in an HTHP reactor (capacity: 300 ml). 10 wt. % of powdered CoMo/$Al_2O_3$ catalyst (1.897 g w.r.t. ash and moisture free algae) of the present disclosure was added to the reactor. The reactor was then closed. Leak check was done using nitrogen at 120 bar. Nitrogen pressure was released and the required amount of hydrogen (35 bar) was filled and heated to reaction temperature (350° C.) with 500 rpm stirring speed. Upon reaching the temperature, the reactor was kept under the same condition for 30 min. It was then cooled with chilled water facility and the gas was collected for gas analysis. The reactor was opened and the product was collected in a beaker. Oil, aqueous and solid phases were separated and measured individually. The mixture was filtered using a Buckner flask. The obtained powder was washed with Dichloromethane and water and then dried. The liquids (oil and aqueous phase) were separated by solvent extraction method.

EXAMPLE 4B

Catalytic Hydrothermal Liquefaction using Chlorella 21 g chlorella as 20% slurry in water was loaded in an HTHP reactor (capacity: 300 ml). 10 wt. % of powdered CoMo/$Al_2O_3$ catalyst (1.897 g w.r.t. ash and moisture free algae) of the present disclosure was added to the reactor. The reactor was then closed. Leak check was done using nitrogen at 120 bar. Nitrogen pressure was released and the required amount of hydrogen (35 bar) was filled and heated to reaction temperature (350° C.) with 500 rpm stirring speed. Upon reaching the temperature, the reactor was kept under the same condition for 30 min. It was then cooled with chilled water facility and the gas was collected for gas analysis. The reactor was opened and the product was collected in a beaker. Oil, aqueous and solid phases were separated and measured individually. The mixture was filtered using a Buckner flask. The obtained powder was washed with Dichloromethane and water and then dried. The liquids (oil and aqueous phase) were separated by solvent extraction method.

EXAMPLE 5

The process of example 4A and 4B was repeated using 10 wt. % of powdered NiMo/$Al_2O_3$ catalyst obtained in example 2.

EXAMPLE 6

The process of example 4A and 4B was repeated using 10 wt. % of powdered Rh/$ZrO_2$ catalyst obtained in example 3.

EXAMPLE 7

Catalytic Hydrothermal Liquefaction using Fresh Water Microalgae, *Spirulina*

23 g of *Spirulina* as 20% slurry in water loaded in a reactor (HTHP reactor, capacity: 300 ml). 10 wt. % of powdered CoMo/$Al_2O_3$ catalyst (1.897 g w.r.t. ash and moisture free algae) of the present disclosure was added to the reactor. The reactor was then closed. Leak check was done using nitrogen at 120 bar. The nitrogen pressure was released and the required amount of hydrogen (35 bar) was filled and heated to reaction temperature (350° C.) with 500 rpm stirring speed. Upon reaching the temperature, the reactor was kept under the same conditions for 30 min. It was then cooled with chilled water facility and the gas was collected for gas analysis. The reactor was opened and the product was collected in a beaker. Oil, aqueous and solid phases were separated and measured individually. The mixture was filtered using a Buckner flask. The powder was washed with Dichloromethane and water and dried. The liquids (Oil and aqueous phase) were separated by gravimetric method.

EXAMPLE 8

The process of example 7 was repeated using 10 wt. % of powdered NiMo/$Al_2O_3$ obtained in example 2.

EXAMPLE 9

The process of example 7 was repeated using 10 wt. % of powdered Rh/$ZrO_2$ obtained in example 3.

The comparative results of % HTL oil yield for conventional methods (without catalyst/with commercial catalysts) vis-à-vis catalysts of the present disclosure are provided in the Table No. 1:

Yield (%) of HTL oil was calculated as weight of oil product×100/weight of moisture and ash free algae in the HTL slurry.

TABLE NO. 1

| | % Crude Bio Oil yield | | |
|---|---|---|---|
| Catalysts | Nannochloropsis | Spirulina | Chlorella |
| Without catalyst | 58 | 46 | — |
| CoMo/Al$_2$O$_3$ (Commercial) | 68 | 48 | — |
| NiMo/Al$_2$O$_3$ (Commercial) | 65 | 48 | — |
| Present (CoMo/Al$_2$O$_3$ + hexamethyleneimine) Example 1 | 73 | 57 | 59 |
| Present (NiMo/Al$_2$O$_3$ + hexamethyleneimine) Example 2 | 69 | 55 | 56 |
| Present (Rh/ZrO$_2$ + hexamethyleneimine) Example 3 | 71 | 55 | 45 |
| Present (CoMo/ZrO$_2$ + hexamethyleneimine) Example 1E | 71 | 61 | — |
| Present (CoMo/Al$_2$O$_3$ + 25% ammonia solution) Example 1A | 63 | 51 | 49 |
| Present (CoMo/Al$_2$O$_3$ + cyclohexylamine) Example 1B | 60 | 50 | 50 |
| Present (NiMo/Al$_2$O$_3$ + 25% ammonia solution) Example 2A | 60 | 51 | 48 |
| Present (NiMo/Al$_2$O$_3$ + cyclohexylamine) Example 2B | 61 | 52 | 49 |
| Present (CoMo/ZrO$_2$ + 25% ammonia solution) Example 1C | 63 | — | — |
| Present (CoMo/ZrO$_2$ + cyclohexylamine) Example 1D | 61 | — | — |

From the results, it is clear that % HTL oil yield by the process of the present disclosure which utilizes a catalyst comprising a solubilizing agent is 48 to 73%. Whereas, the % HTL oil yield using the commercial catalyst (which is devoid of a solubilizing agent) ranges from 48 to 68%.

It is particularly found that when a catalyst comprising hexamethyleneimine as a solubilizing agent is utilized for liquefaction of high lipid *Nannochloropsis* algae, % HTL oil yield is 69 to 73%. Thus, when hexamethyleneimine is used as a solubilizing agent, the process of the present disclosure provides high yield of crude bio oil than the crude bio oil yield obtained by the process which utilize commercial catalyst.

The following examples illustrate preparation of the extruded form of the catalyst composition using extruded support which may be recycled and regenerated as per process of the present disclosure:

EXAMPLE-10

PREPARATION of SUPPORT

EXAMPLE 10

A: Alumina Support Preparation (10 g Batch)
Pseudoboehmite (4.0 g) and alumina (7.0 g) were taken. To this, 6 ml of diluted solution of orthophosphoric acid was mixed to obtain aluminophosphate gel. This gel was mixed in a mortar-pestle and pegged to extrudable dough.

B: Alumina Support Preparation (10 g Batch)
Pseudoboehmite (4.0 g) and alumina (7.0 g) were taken. To this, 7 ml of diluted solution of acetic acid was mixed to obtain aluminum acetate gel. This gel was mixed in a mortar-pestle and pegged to extrudable dough.

C: Zirconia Support Preparation (10 g Batch)
Zirconium hydroxide powder (14.0 g) and Pseudoboehmite alumina (4.0 g) were mixed. Diluted solution of orthophosphoric acid (6 ml) was added while mixing to prepare Zirconium phosphate gel. This gel was mixed in a mortar-pestle and pegged to extrudable dough.

D: Zirconia Support Preparation (10 g Batch)
Zirconium hydroxide powder (14.0 g) and Pseudoboehmite alumina (4.0 g) were mixed. Diluted solution of acetic acid (7 ml) was added while mixing to prepare Zirconium acetate gel. This gel was mixed in a mortar-pestle and pegged to extrudable dough.

E: Zeolite Support Preparation (10 g Batch)
To make zeolite extrudates, Pseudoboehmite alumina (4.0 g) and diluted solution of orthophosphoric acid (6 ml) were mixed thoroughly with a mixture of zeolite powder (7.0 g) and hydroxypropylmethyl cellulose (HPMC, 0.1 g) in a mortar-pestle and pegged to extrudable dough.

Upon making the above said dough, it was passed through extruder/nodulizer and obtained extrudates like wires. It was then dried at room temperature for 2 hours followed by 120° C. for 6 hours. Finally, it was calcined at 540-600° C. in presence of air for 6 hours in an air flow.

EXAMPLE 11

A]

Preparation of a Catalyst Composition

Dispersion A was prepared by dissolving cobalt acetate (0.863 g) in water (10 ml) at 30° C. for 10 minutes. Separately, dispersion B was prepared by dissolving ammonium molybdate (10.41 g) and hexamethyleneimine (7 g) in water (70 ml) at 60° C. for 30 minutes at 300 rpm.

Dispersions A and B were then mixed together at 30° C. To this alumina support of example 10 A (10 gm) was added and mixed for 2 hours to obtain a mixture. The liquid from the mixture was discarded and the remaining mass was dried at room temperature for 2 hours. This mass was further dried at 120° C. for 10 hours and calcined in presence of air at 600° C. for 6 hours. The resulting calcined mass was subjected to reduction in the presence of hydrogen at 500° C. for 4 hours to obtain the catalyst (CoMo/Al$_2$O$_3$).

B (COMPARATIVE EXAMPLE)

The process of example 11A was repeated except that 8 g of ammonia solution (25%) was used instead of hexamethyleneimine (7 g).

C]
The process of example 11A was repeated except that 8 g of cyclohexylamine was used instead of hexamethyleneimine (7 g).

EXAMPLE 12

A](COMPARATIVE EXAMPLE)

The process of example 11A was repeated except that 8 g of ammonia solution (25%) was used instead of hexamethyleneimine (7 g) and zirconia support of example 10C was used instead of alumina support.

B]
The process of example 11A was repeated except that 8 gm of cyclohexylamine was used instead of hexamethyleneimine (7 g) and zirconia support of example 10 C was used instead of alumina support.

C]
The process of example 11A was repeated except that zirconia support of 10D was used instead of alumina support.

D] The process of example 11A was repeated except that Zeolite support of example 10 E was used instead of alumina support.

EXAMPLE 13

A] Preparation of a Catalyst Composition

Dispersion A was prepared by dissolving nickel nitrate (1.011 g) in water (10 ml) at 30° C. for 10 minutes. Separately, dispersion B was prepared by dissolving ammonium molybdate (10.41 g) and hexamethyleneimine (7 g) in water (70 ml) at 60° C. for 30 minutes at 300 rpm.

Dispersions A and B were then mixed together at 30° C. To this alumina support of example 10 A (10 g) was added and mixed for 2 hours to obtain a mixture. The liquid from the mixture was discarded and the remaining mass was dried at room temperature for 2 hours. This mass was further dried at 120° C. for 10 hours and calcined at 600° C. in presence of air for 6 hours. The resulting calcined mass was subjected to reduction in the presence of hydrogen at 500° C. for 4 hours to obtain the catalyst ($NiMo/Al_2O_3$).

B](COMPARATIVE EXAMPLE)

The process of example 13A was repeated except that 7 g of ammonia solution (25%) was used instead of hexamethyleneimine (7 g).

C]
The process of example 13A was repeated except that 7 g of cyclohexylamine was used instead of hexamethyleneimine (7 g).

EXAMPLE 14

Preparation of Catalyst Composition

Dispersion A was prepared by dissolving rhodium chloride (0.381 g) and hexamethyleneimine (7 g) in water (100 ml) at 30° C. for 30 minutes at 300 rpm. To this zirconia support obtained in 10 C (10 g) was added and mixed for 2 hours at 30° C. to obtain a mixture. The liquid from the mixture was discarded and the remaining mass was dried at room temperature for 2 hours. This mass was further dried at 120° C. for 10 hours and calcined in presence of air at 600° C. for 6 hours. The resulting calcined mass was subjected to reduction in the presence of hydrogen at 500° C. for 4 hours to obtain the catalyst (Rh/Zirconia).

EXAMPLE 15

Catalytic Hydrothermal Liquefaction using Marine Microalgae, *Nannochloropsis*

21 g *Nannochloropsis* as 20% slurry in water loaded in an HTHP reactor (capacity: 300 ml). 10 wt. % of extruded $CoMo/Al_2O_3$ catalyst, obtained in example 11A (1.897 g w.r.t. ash and moisture free algae) of the present disclosure was added to the reactor. The reactor was then closed. Leak check was done using nitrogen at 120 bar. Nitrogen pressure was released and the required amount of hydrogen (35 bar) was filled and heated to reaction temperature (350° C.) with 500 rpm stirring speed. Upon reaching the temperature, the reactor was kept under the same condition for 30 min. It was then cooled with chilled water facility and the gas was collected for gas analysis. The reactor was opened and the product was collected in a beaker. Oil, aqueous and solid phases were separated and measured individually. The mixture was filtered using a Buckner flask. The powder was washed with Dichloromethane and water and dried. The liquids (oil and aqueous phase) were separated by solvent extraction method.

EXAMPLE 16

The process of example 15 was repeated using 10 wt. % of extruded $NiMo/Al_2O_3$ catalyst, obtained in example 13A.

EXAMPLE 17

The process of example 15 was repeated using 10 wt. % of extruded $Rh/ZrO_2$ catalyst obtained in example 14.

EXAMPLE 18

Catalytic Hydrothermal Liquefaction using Fresh Water Microalgae, *Spirulina*

23 g of *Spirulina* as 20% slurry in water was loaded in a reactor (HTHP reactor, capacity: 300 ml). 10 wt. % of extruded $CoMo/Al_2O_3$ catalyst, obtained in example 11A (1.897 g w.r.t. ash and moisture free algae) of the present disclosure was added to the reactor. The reactor was then closed. Leak check was done using nitrogen at 120 bar. The nitrogen pressure was released and the required amount of hydrogen (35 bar) was filled and heated to reaction temperature (350° C.) with 500 rpm stirring speed. Upon reaching the temperature, the reactor was kept under the same conditions for 30 min. It was then cooled with chilled water facility and the gas was collected for gas analysis. The reactor was opened and the product was collected in a beaker. Oil, aqueous and solid phases were separated and measured individually. The mixture was filtered using a Buckner flask. The powder was washed with Dichloromethane and water and dried. The liquids (Oil and aqueous phase) were separated by gravimetric method.

EXAMPLE 19

The process of example 18 was repeated using 10 wt. % of extruded NiMo/Al$_2$O$_3$ obtained in example 13A.

EXAMPLE 20

The process of example 18 was repeated using 10 wt. % of extruded Rh/ZrO$_2$ obtained in example 14.

EXAMPLE 21

Recovery of the Catalyst

The solid residue obtained in example 15 was subjected to sieving to separate the catalyst. The obtained catalyst was then subjected to calcination at 600° C. and then subjected to reduction in the presence of hydrogen at 500° C. to obtain a catalyst ready for recycle.

EXAMPLE 22

The process of example 21 was repeated except that the solid residue obtained in example 16 was used.

EXAMPLE 23

Recycling of the Catalyst

The catalyst recovered as per example 21 was used for hydrothermal liquefaction of microalgae. The process of example 15 was repeated.

The comparative results of % crude bio oil yield are provided in the table No. 2.

TABLE 2

| | Crude Bio Oil Yield (%) | | | |
| --- | --- | --- | --- | --- |
| | Algae, *Nannochloropsis* | | Algae, *Spirulina* | |
| Runs | CoMo/Al2O3 obtained in example 11 | NiMo/Al2O3 obtained in example 13 | CoMo/Al2O3 obtained in example 11 | NiMo/Al2O3 obtained in example 13 |
| Catalyst - 1(Fresh) | 70 | 68 | 57 | 55 |
| 1st Regeneration | 69 | 68 | 57 | 56 |
| 2nd Regeneration | 70 | 67 | 58 | 57 |
| 3rd Regeneration | 68 | 69 | 56 | 55 |
| 4th Regeneration | 69 | 68 | 56 | 56 |
| 5th Regeneration | 70 | 68 | 57 | 55 |

The comparative properties of the fresh and recovered catalyst are provided in table No. 3.

TABLE 3

| Sr. No. | Catalyst Name | XRD (Crystallinity) | BET, m$^2$/g | Pore volume (cc/g) | Pore diameter (Å) | NH3-TPD (mmol/g) | TGA (% wt loss up-to 900° C.) |
| --- | --- | --- | --- | --- | --- | --- | --- |
| 1 | Catalyst-1 (Fresh), prepared as per example 11A | Quasi crystalline | 176 | 0.496 | 98 | 0.842 | 7.20 |
| 3 | Catalyst-2 (Regenerated), prepared as per example 21 | Quasi crystalline | 170 | 0.479 | 101 | 0.813 | 9.55 |
| 4 | Catalyst-3 (Fresh) prepared as per example 13A | Quasi crystalline | 181 | 0.503 | 96 | 0.812 | 11.42 |
| 6 | Catalyst-4 (Regenerated) prepared as per example 22 | Quasi crystalline | 165 | 0.455 | 100 | 0.805 | 9.28 |

Yield (%) of crude bio oil was calculated as weight of oil product×100/weight of moisture and ash free algae.

From the results, it is clear that % crude bio oil yield by using the regenerated catalyst of the present disclosure is similar to that of fresh catalysts.

The following examples illustrate preparation of the catalyst composition using nano-structured support of the present disclosure.

Preparation of Nano-Structured Support

EXAMPLE 24

Solution A was prepared by dissolving 8 g of Pluronic-123 (poly(ethylene oxide)-poly(propylene oxide)-poly(ethylene oxide)) in 75 g of ethyl alcohol.

Separately, Solution B was prepared by dissolving 16 g aluminum iso-propoxide (Al(OPri)3 in the mixture of 10 ml 60% nitric acid and 70 g ethyl alcohol.

Solution B was added to Solution A with stirring. Stirring was continued for 4 h at room temperature. The resultant solution was kept in oven at 60° C. for 72 h for evaporation of, ethanol and for crystallization. The final powdered nano-structured aluminum oxide was further dried at 110° C. for 6 h. The nano-structured material was obtained by removing Pluronic-123 by calcining at 540° C. for 6 h under the flow of air.

This calcined material was used as a support for the preparation of a catalyst composition by the process as described for examples 11-14.

EXAMPLE 25

In-situ synthesis of mono or multi metallic catalysts of nano-structured aluminum oxide were synthesized by following the same method as described in Example 24. The required amounts of metal salts such as cobalt acetate or nickel acetate with ammonium molybdate, etc. were added during preparation of Solution B. After metal loading, samples were calcined at 540° C. in air and followed by reduced at 500° C. in H2.

EXAMPLE 26

For the preparation of nano-structured zirconium oxide, Solution A was prepared by dissolving 7.5 g of Cetyltrimethylammonium bromide (CTAB) in 25 g of distilled water. Further, 0.5 g of trimethylammonium hydroxide (TMAOH) was added and stirred for 30 min. Solution B was prepared by mixing 53 g of 1-butanol with 33 g of 80% solution of zirconium (iv) butoxide. Solution B was added drop wise into solution A with vigorous stirring to obtain a gel. pH of the gel was adjusted to 10.5-11. Gel was stirred for 2 h at RT and then it was transferred to 500 ml round bottom flask and refluxed at 90° C. for 48 h to obtain nano-structured zirconium oxide was collected by filtration and washing using distilled water. Solid powder of nano-structured zirconium oxide was dried at 110° C. for 6 h and calcined at 600° C. for 6 h under the flow of air.

This calcined material was used as catalyst support for the preparation of a catalyst composition by the process as described for examples 11-14.

EXAMPLE 27

In-situ synthesis of mono or multi metallic catalysts of nano-structured zirconium oxide were synthesized by following the same method as described in Example 26. Metal salts such as cobalt acetate or nickel acetate with ammonium molybdate, etc. were prepared as solution C and added upon addition of solution B into solution A. After metals loading, samples were calcined at 540° C. in air and followed by reduced at 500° C. in H2.

The catalysts synthesized in examples 24-27 were used for the conversion of Bio-mass to crude bio-oil as per the procedure described in example 4 for algal species *Nannochloropsis* and example 7 for algal species *Spirulina*. The results are depicted in Table 4

TABLE 4

CBO yield from different algae species using various catalyst compositions

| Catalyst Name | Algae Species | CBO Yield, % |
| --- | --- | --- |
| No Catalyst | *Spirulina* | 48 |
| CoMo/gamma Alumina | *Spirulina* | 57 |
| CoMo/Nano-structured alumina (Example 24) | *Spirulina* | 56 |
| In-situ CoMo/Nano-structured alumina (Example 25) | *Spirulina* | 60 |
| CoMo/Nano-structured zirconia (Example 26) | *Spirulina* | 59 |
| In-situ CoMo/Nano-structured zirconia (Example 27) | *Spirulina* | 62 |
| No Catalyst | *Nannochloropsis* | 58 |
| CoMo/gamma Alumina | *Nannochloropsis* | 68 |
| CoMo/Nano-structured alumina (Example 24) | *Nannochloropsis* | 67 |
| In-situ CoMo/Nano-structured alumina (Example 25) | *Nannochloropsis* | 70 |
| CoMo/Nano-structured zirconia (Example 26) | *Nannochloropsis* | 65 |
| In-situ CoMo/Nano-structured zirconium oxide (Example 27) | *Nannochloropsis* | 68 |
| CoMo/Nano-structured zirconium oxide (Example 26) | *Nannochloropsis**  | 75 |

*Slurry concentration - 35%

The following example illustrates preparation of the catalyst composition using mesoporous zeolite support of the present disclosure.

EXAMPLE 28

For the preparation of meso-porous zeolite, Solution A was prepared using 6 g of Cetyltrimethylammonium bromide (CTAB) in 450 g of distilled water. Further, 28.5 ml of ammonium hydroxide (NH4OH) was added and stirred for 30 min. In the above solution, 8 g of zeolite power was added, stirred at room temperature for 20 min and then hydrothermally treated at 120-180° C. for 10-24 h. This was cooled, filtered and washed to obtain final meso-porous zeolite in the powder form. The powder was dried at 110° C. for 6 h and calcined at 600° C. for 6 h under the flow of air. This calcined material was used as catalyst composition by the process as described for examples 11-14

The catalysts synthesized in examples 28 was used for the conversion of Bio-mass to crude bio-oil as per the procedure as per the procedure described in example 4 for algae species *Nannochloropsis* and example 7 for algae species *Spirulina*. The results are depicted in Table 5

TABLE 5

CBO yield using various catalyst compositions

| Algae | Catalyst | CBO Yield, % |
| --- | --- | --- |
| *Nannochloropsis* | No Catalyst | 57 |
| *Nannochloropsis* | Neat Meso-porous Zeolite | 61 |
| *Nannochloropsis* | CoMo/Meso-porous Zeolite (Example 28) | 71 |
| *Spirulina* | No Catalyst | 46 |
| *Spirulina* | Neat Mesoporous Zeolite | 50 |
| *Spirulina* | CoMo/Mesoporous Zeolite (Example 28) | 61 |

Technical Advance and Economic Significance:

The present disclosure provides a method for the preparation of a catalyst at a room temperature having better catalytic activity. The catalyst mainly contains a solubilizing agent, particularly hexamethyleneimine (HMI) which exhibits better solubilizing effect on the catalyst metal salts and results in a metal complex formation, which in turn helps in stabilization of the catalyst metal on a metal oxide support.

The present disclosure also provides a simple and high yielding process for the conversion, and specifically, hydrothermal conversion of biomass to crude bio oil.

The process of the present disclosure involves heating the biomass only once at pre-determined temperature and pressure conditions, thus the process is time saving and energy efficient.

The conversion process of the present disclosure can be carried out at sub-critical conditions of temperature and pressure to give higher yield of crude bio oil.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for the preparation of a catalyst composition having at least one metal in an amount of 0.1 to 15 wt. %; and at least one support in an amount of 30 to 96 wt %, said process comprising the following steps:
   a. obtaining at least one support selected from the group consisting of alumina, silica, zirconia, alumina-silica, zeolite and molecular sieves;
   b. preparing at least one dispersion containing at least one metal or metal compound and at least one solvent, said metal compound comprises a metal selected from the group consisting of group IB metals, group IIB metals, group IVB metals, group VB metals, group VIB metals, group VIIB metals, group VIII metals and noble metals;
   c. adding a solubilizing agent to one or more of said at least one dispersion/s wherein said solubilizing agent is hexamethyleneimine;
   d. obtaining a mixture of said at least one dispersion, wherein said one or more of said at least one dispersion/s comprises said solubilizing agent;
   e. impregnating said mixture in said support to obtain a metal impregnated support;
   f. drying the metal impregnated support followed by calcining to obtain a calcined metal impregnated support; and
   g. reducing the calcined metal impregnated support in the presence of hydrogen at a temperature un the range 400° C. to 600° C. to obtain the catalyst.

2. The process as claimed in claim 1, wherein the method step (c) comprises a step of mixing at least two dispersions, each containing at least one metal or metal compound before the addition of said solubilizing agent.

3. The process as claimed in claim 1, wherein the solvent for preparing said at least one dispersion is selected from the group consisting of polar solvents and non-polar solvents.

4. The process as claimed in claim 1, wherein the step of obtaining a support includes the steps of mixing at least one carrier; at least one binder selected from the group consisting of aluminophosphate, pseudoboehmite, silica, alumina, and ludox silica solution; at least one agent selected from the group consisting of peptizing agent, pH adjusting agent and template directing agent; and optionally, at least one liquid medium; in any order to obtain a dough, obtaining extrudates from said dough, drying said extrudates and calcining said dried extrudates, wherein, the peptizing agent is at least one selected from the group consisting of phosphoric acid and acetic acid;
   the pH adjusting agent is at least one compound selected from the group consisting of nitric acid, ammonium hydroxide and trimethylammonium hydroxide;
   the template directing agent is at least one selected from the group consisting of pluronic 123 and cetyltrimethylammonium bromide; and
   the liquid medium is at least one selected from the group consisting of water and ethyl alcohol.

5. The process as claimed in claim 1, wherein said support comprises a) 30 to 100 wt % at least one carrier selected from the group consisting of alumina, silica, zirconia, alumina-silica, zeolite and molecular sieves; and b) 0.001 to 70 wt % of at least one binder selected from the group consisting of aluminophosphate, pseudoboehmite, alumina, silica and ludox silica solution.

6. The process as claimed in claim 1, wherein said support comprises a) 30 to 100 wt % at least one carrier selected from the group consisting of nano-structured aluminum oxide, nano-structured silicon oxide, nano-structured zirconium oxide, nano-structured cerium oxide, nano-structured titanium oxide, nano-structured tantalum oxide; and b) 0.001 to 70 wt % of at least one binder selected from the group consisting of aluminophosphate, pseudoboehmite, alumina, silica and ludox silica solution.

7. The process as claimed in claim 1, wherein said support comprises a) 30 to 100 wt % at least one carrier selected from the group consisting of mesoporous alumino silicate, mesoporous silicate, mesoporous molecular sieves; and b) 0.001 to 70 wt % of at least one binder selected from the group consisting of aluminophosphate, pseudoboehmite, alumina, silica and ludox silica solution.

8. The process as claimed in claim 1, wherein the metal is selected from the group consisting of nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru) and rhodium (Rh); and the metal compound comprises a cation selected from the group consisting of nickel (Ni), molybdenum (Mo), cobalt (Co), zinc (Zn), zirconium (Zr), vanadium (V), tungsten (W), rhenium (Re), platinum (Pt), palladium (Pd), ruthenium (Ru) and rhodium (Rh); and an anion selected from the group consisting of chlorides, bromides, fluorides, iodides, sulfates, phosphates, phosphonates, nitrates, nitrites, carbonates, acetates, acetylacetates, acetylacetonates, bicarbonates, hydroxides and oxides.

* * * * *